United States Patent [19]

Nakamura et al.

[11] Patent Number: 4,621,531
[45] Date of Patent: Nov. 11, 1986

[54] ULTRASONIC MICROSCOPE

[75] Inventors: Yuzo Nakamura; Soji Yamamoto; Mitsugu Sakai; Fumio Uchino, all of Hachioji, Japan

[73] Assignee: Olympus Optical Co., Ltd., Tokyo, Japan

[21] Appl. No.: 664,428

[22] Filed: Oct. 24, 1984

[30] Foreign Application Priority Data

Nov. 2, 1983 [JP] Japan .................................. 58-204722

[51] Int. Cl.$^4$ ............................................ G01N 29/00
[52] U.S. Cl. ........................................ 73/606; 350/507
[58] Field of Search .......................... 73/606, 607, 620; 350/507

[56] References Cited

U.S. PATENT DOCUMENTS 4,011,748  3/1977  Bond et al. ............................. 73/618

FOREIGN PATENT DOCUMENTS 0074657  5/1982  Japan ..................................... 73/606
0118958  7/1983  Japan ..................................... 73/606

Primary Examiner—Stephen A. Kreitman
Attorney, Agent, or Firm—Parkhurst & Oliff

[57] ABSTRACT

An ultrasonic microscope having an ultrasonic head and an optical head is disclosed. A slide plate on which the ultrasonic head and optical head are arranged in such a manner that they are separated by a predetermined spacing in Y direction is slidably secured to an arm of the ultrasonic microscope. Under such a construction, an ultrasonic observation by an ultrasonic raster image and an optical observation by an optical image can be performed precisely for the same region of a specimen by moving the ultrasonic head and optical head integrally by a distance substantially equal to the spacing by means of the slide plate.

6 Claims, 5 Drawing Figures

FIG_2

ULTRASONIC MICROSCOPE

BACKGROUND OF THE INVENTION

The present invention relates to an ultrasonic microscope having in addition to an ultrasonic head an optical head, by means of which both ultrasonic observation and optical observation can be selectively performed by changing the heads with the aid of a slide mechanism.

Heretofore, there has been utilized an ultrasonic microscope having both an ultrasonic head including an ultrasonic transducer and an optical head including an objective lens, by means of which ultrasonic and optical images of a specimen can be observed selectively. In the ultrasonic microscope mentioned above, it is often necessary to observe the same region of the specimen both with ultrasonic observation and with optical observation. However, in this known ultrasonic microscope, since the objective lens and the ultrasonic head have substantially similar dimensions so that the observation axes of the ultrasonic and optical images can not come close to each other, this results in the disadvantage that the regions observed by the ultrasonic head and by the objective lens are greatly shifted from each other.

In this case, in order to correspond these regions precisely with each other, a very cumbersome operation must be performed such that once after observed by one head the specimen is positioned correctly at a visual field of the other head by moving a specimen stage. However, since the visual field of the ultrasonic wave is very small on the order of 0.1 mm square, high accuracy is required for movement of the specimen stage. Further, since contour configurations of the ultrasonic image and the optical image are usually not identical with each other, registration of the ultrasonic and optical images becomes much more difficult. Therefore, it is extremely difficult to position the region correctly at an observation position by a manual operation while observing the specimen image. Moreover, in order to effect a precise positioning use may be made of a driving device which moves the specimen stage for effecting a sub-scanning operation of the ultrasonic observation. In this case, it is almost impossible to effect precise positioning quickly due to a slow movement of the specimen stage and a low positioning accuracy.

SUMMARY OF THE INVENTION

The present invention has for its object to eliminate the drawbacks mentioned above and to provide an ultrasonic microscope in which an ultrasonic observation and an optical observation can be precisely effected for the same region of a specimen by moving an ultrasonic head and an optical head integrally in a simple manner by means of a slide mechanism.

According to the invention, in an ultrasonic microscope for observing an ultrasonic raster image of a specimen on a monitor by scanning the specimen by vibrating an ultrasonic head in the X direction by a vibrator and by moving a specimen stage in the Y direction on which the specimen is placed, and for observing an optical image of the sample by means of a light source, an eyepiece, and an optical head including an objective lens, the improvement comprises a slide plate on which are arranged the ultrasonic head and objective lens which are separated by a predetermined spacing in the Y direction, the slide plate being slidable in the Y direction by a distance substantially equal to the predetermined spacing so as to make the ultrasonic raster image substantially identical with said optical image.

DESCRIPTION OF THE PREFERRED EMBODIMENTS

Figure 1:
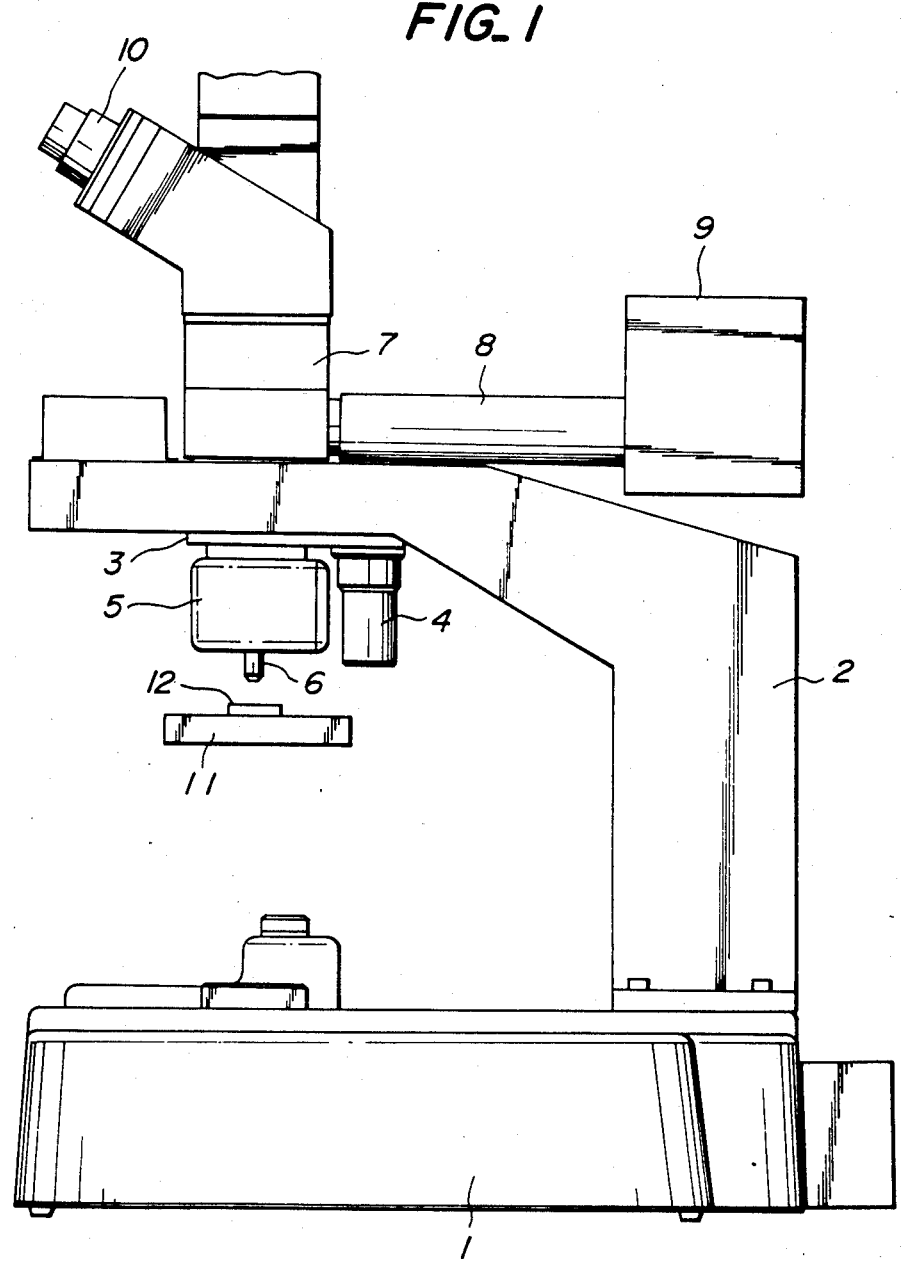
FIG. 1 is a side view showing one embodiment of the ultrasonic microscope according to the invention.
Figure 2:
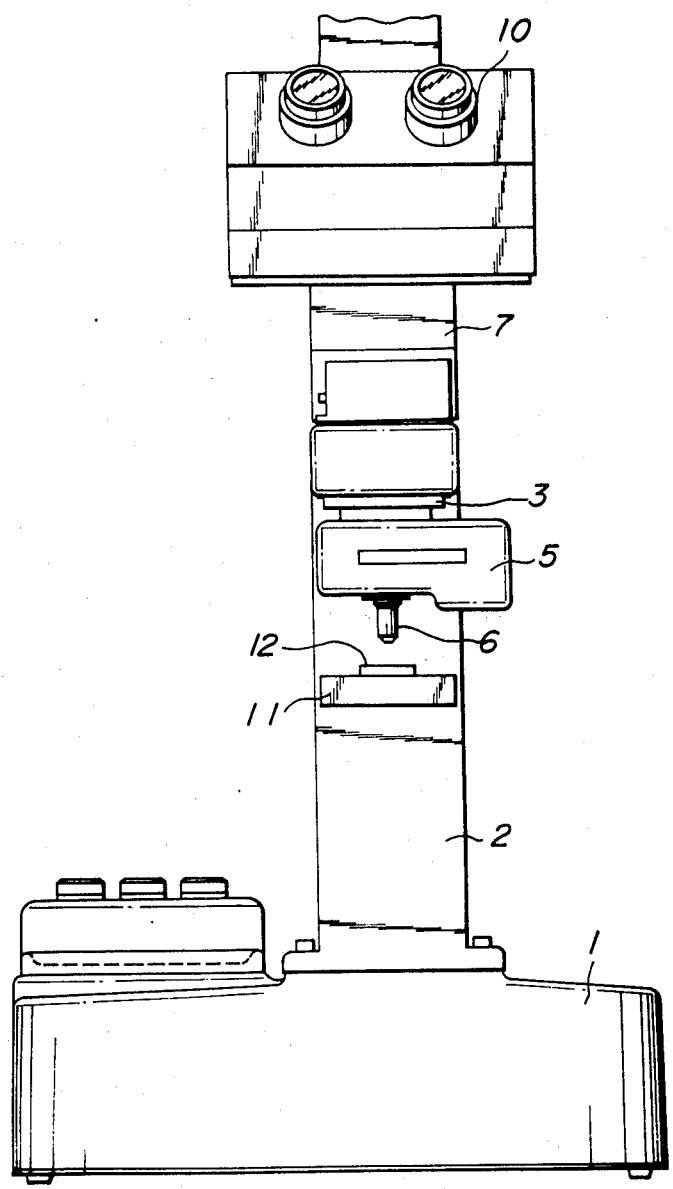
FIG. 2 is a front view of the ultrasonic microscope illustrated in FIG. 1.

FIGS. 1 and 2 are side and front views showing one embodiment of the ultrasonic microscope according to the invention. First, the whole construction of the ultrasonic microscope according to the invention will be explained with reference to FIGS. 1 and 2. In this embodiment, an arm 2 is fixedly secured to a base 1, and a slide plate 3 is secured to the arm 2 slidably in the Y direction. A slidable connection between the slide plate 3 and the arm 2 is realized by dovetail grooves, and a click mechanism (22) for limiting the slidable movement of the slide plate 3 is provided. An optical head 4 including an objective lens for the optical observation and an ultrasonic head 6 with a vibrator 5 are secured to the slide plate 3 at a predetermined interval along the Y direction. The optical head 4 is detachably arranged to the slide plate 3 so as to observe the specimen 12 at various magnifications. Moreover, a lens-barrel 7 is secured to the arm 2, and also a light source 9 comprising a reflection type illumination system is secured to the arm 2 through a light transmitter 8. Further, a binocular eyepiece 10 is secured to the lens-barrel 7. Under the heads for the purpose of specimen observation is arranged a specimen stage 11 which is movable in the Y direction, and the specimen stage 11 is further connected with a driving device (not shown) for sub-scanning the specimen 12 placed on the stage 11 in the Y direction in case of ultrasonic observation.

Next, observing operations will be explained. When the ultrasonic observation is to be effected, the specimen 12 to be observed is at first placed on the specimen stage 11, and then the slide plate 3 is manually moved into an ultrasonic observating position so that the ultrasonic head 6 moves specimen near an observation axis of the microscope as illustrated in FIG. 1. A vibration in the X direction is applied to the ultrasonic head 6 by means of the vibrator 5 so as to effect a main-scanning operation in the X direction (vertical direction with respect to a plane of the drawing of FIG. 1), and simultaneously the specimen stage 11 is moved at a constant speed in the Y direction so as to effect the sub-scanning operation. In this manner, a raster scanning operation for the specimen 12 is performed by the ultrasonic head 6. While effecting the scanning operation, an ultrasonic beam is projected from the ultrasonic head 6 to the specimen 12, and the ultrasonic beam reflected from the specimen 12 is collected by the ultrasonic head so as to be converted into an electric signal. The thus converted electric signal is suitably processed to obtain an image signal, and the image signal is further supplied to a monitor so as to display an ultrasonic image.

When the optical observation is to be performed in succession after the ultrasonic observation is ended, the slide plate 3 is manually moved in the Y direction by such a distance that the optical axis of the objective lens 4 comes near the observation axis of the microscope. It is preferable that the optical axis of the objective lens 4 is made completely identical with the observation axis of the microscope so that the specimen 12 is kept on the optical axis of the microscope. In this case, since the moving distance is limited by the click mechanism arranged between the slide plate 3 and the arm 2, it is possible to effect the positioning operation of the objective lens 4 simply and accurately. The slide plate 3 has a hole for transmittting a light between the objective lens 4 and the lens-barrel 7, and thus an illumination light emitted from the light source 9 can be introduced onto a surface of the specimen 12 through the light transmitter 8, the lens-barrel 7 and the objective lens 4. Therefore, a light flux reflected from the surface of the specimen 12 can be observed by means of the objective lens 4, the hole formed in the slide plate 3, the lens-barrel 7 and the eyepiece 10. In this manner, according to the invention the ultrasonic head 6 and the optical head 4 are separated by a predetermined spacing in the Y direction on the slide plate 3 arranged slidably in the Y direction and the slide plate 3 is slidable over the distance substantially equal to said spacing, and therefore, it is possible to position the heads accurately in an easy manner without moving the specimen stage 11.

Figure 3:
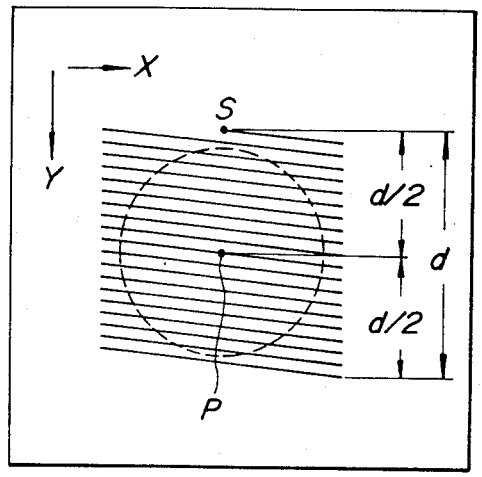
FIG. 3 is a schematic view depicting a scanning region of the ultrasonic observation and a visual field of the optical observation.

Finally, the operation of setting a moving distance of the slide plate 3 will be explained. FIG. 3 is a schematic view showing a scanning region of the ultrasonic head 6 and a visual field of the objective lens 4 on the specimen. In FIG. 3, the solid line illustrates a scanning line of the ultrasonic head 6, and the dotted circle depicts the visual field observed by the objective lens 4. The ultrasonic head 6 starts the scanning operation from a start position S and scans a substantialy square region to form a square raster. The visual field observed by the objective lens 4 is a substantially circular region in which the observation axis P of the microscope is positioned at a center of the scanning region of the ultrasonic head 6.

Figure 4A:
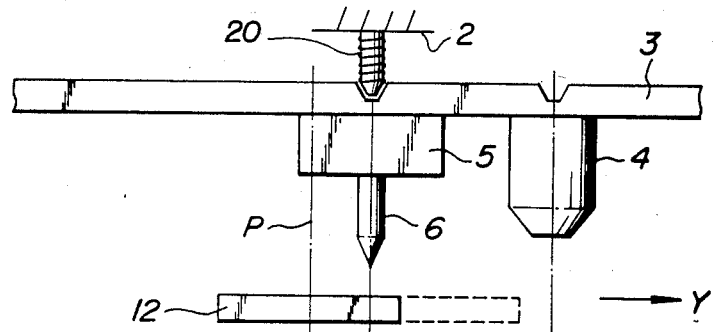
FIGS. 4A and 4B are schematic views showing a moving distance of a slide plate.
Figure 4B:
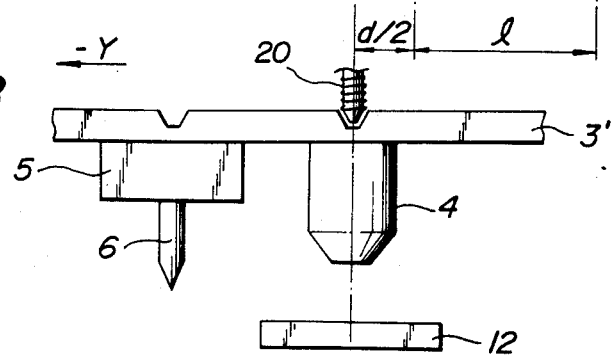

Therefore, as can be seen from FIG. 3, in order to make identical the scanning region of the ultrasonic head 6 with the visual field of the objective lens 4, the optical axis must be shifted from the start position S by a distance d/2, where d is the sub-scanning distance of the ultrasonic head 6. FIGS. 4A and 4B are schematic views showing the moving distance of the slide plate 3 for positioning the head to the observing position, and represent arranging positions in case of the ultrasonic observation and the optical observation, respectively. In these embodiments, the specimen 12 is arranged on the axis of the ultrasonic microscope, the spacing between the ultrasonic head 6 and the optical head 4 is l, the sub-scanning distance of the ultrasonic observation is d, and the specimen stage 11 is movable by the distance d in the Y direction during the ultrasonic observation. Moreover, in case of effecting the ultrasonic observation, the ultrasonic head 6 has to be deviated from the observation axis P of the microscope (represented by the one-dotted chain line) by the distance d/2 in the Y direction, and in case of effecting the optical observation the observation axis P of the microscope should be made completely identical with the optical axis of the objective lens 4. Therefore, when the optical observation is performed after the ultrasonic observation is ended, the slide plate 3 is moved by the distance l+d/2 in the −Y direction. Further, when the ultrasonic observation is performed after the optical observation is ended, the slide plate 3 is moved by the distance l+d/2 in the Y direction. In the embodiment mentioned above, the sub-scanning is performed in the Y direction, but it is possible to effect the sub-scanning in the −Y direction. In this case, the slide plate 3 must be moved by the distance l−d/2. According to the invention, since the movement of the slide plate 3 is limited between the two predetermined positions by means of the click mechanism arranged between the arm 2 and the slide plate 3, the operator can move the slide plate 3 in the Y direction or the −Y direction accurately by the distance mentioned above, so that it is possible to position each head easily, promptly and accurately into the desired observing positions. It should be noted that the slide plate holding the ultrasonic head and optical head may be moved in the Y direction not only manually, but also automatically by using a suitable driving device.

As mentioned above, according to the invention, it is possible to observe the same region of the specimen both in case of the ultrasonic observation and the optical observation in such an easy operation that the slide plate on which the ultrasonic head and the optical head are provided is moved in the Y direction or the −Y direction. Therefore, the ultrasonic observation accurately corresponds to the optical observation. Moreover, since the slide plate moves only linearly in the Y direction, the construction can be made extremely simple and also the positioning accuracy can be improved.

What is claimed is:

1. An ultrasonic microscope for observing an ultrasonic raster image of a specimen on a monitor by scanning the specimen by vibrating an ultrasonic head in the X direction by a vibrator and by moving a specimen stage in the Y direction on which the specimen is placed, and for observing an optical image of the sample by means of a light source, an eyepiece, and an optical head including an objective lens, comprising:

a slide plate on which are arranged said ultrasonic head and said objective lens which are separated by a predetermined spacing in the Y direction, said slide plate being slidable in the Y direction by a distance substantially equal to said predetermined spacing so as to make substantially identical said ultrasonic raster image with said optical image.

2. An ultrasonic microscope according to claim 1, wherein said distance along which the slide plate is slidable is set to a sum of said spacing between said ultrasonic head plus objective lens and the half of a sub-scanning distance of said ultrasonic head in the Y direction.

3. An ultrasonic microscope according to claim 1, wherein said distance along which the slide plate is slidable is set to said spacing between said ultrasonic head and objective lens less a half of the sub-scanning distance of said ultrasonic head in the Y direction.

4. An ultrasonic microscope according to claim 1, wherein the movement of the slide plate is limited by a click mechanism cooperating with said slide plate.

5. An ultrasonic microscope according to claim 1, wherein said ultrasonic raster image is substantially equal to said optical image in size.

6. An ultrasonic microscope according to claim 1, wherein said eyepiece is a binocular eyepiece.

* * * * *